United States Patent
Motos et al.

(10) Patent No.: US 11,397,259 B2
(45) Date of Patent: Jul. 26, 2022

(54) TIME-OF-FLIGHT MEASUREMENT SYSTEM AND METHOD

(71) Applicant: TEXAS INSTRUMENTS INCORPORATED, Dallas, TX (US)

(72) Inventors: Tomas Motos, Hamar (NO); Espen Wium, Oslo (NO); Trond Meckelborg Rognerud, Sorumsand (NO); Aslak Ringvoll Normann, Oslo (NO); Oskar Gustaf Fredrik Von Heideken, Oslo (NO); Reidar Myhr, Oslo (NO)

(73) Assignee: Texas Instmments Incorporated, Dallas, TX (US)

( * ) Notice: Subject to any disclaimer, the term of this patent is extended or adjusted under 35 U.S.C. 154(b) by 416 days.

(21) Appl. No.: 16/358,326

(22) Filed: Mar. 19, 2019

(65) Prior Publication Data

US 2019/0361110 A1    Nov. 28, 2019

Related U.S. Application Data

(60) Provisional application No. 62/786,372, filed on Dec. 29, 2018, provisional application No. 62/676,768, filed on May 25, 2018.

(51) Int. Cl.
*G01S 13/87* (2006.01)
*G01S 7/285* (2006.01)
*G01S 13/76* (2006.01)

(52) U.S. Cl.
CPC ............ *G01S 13/878* (2013.01); *G01S 7/285* (2013.01); *G01S 13/76* (2013.01); *G01S 13/765* (2013.01); *G01S 13/767* (2013.01); *G01S 13/876* (2013.01)

(58) Field of Classification Search
CPC ...... G01S 13/878; G01S 13/876; G01S 7/285; G01S 13/767; G01S 13/765; G01S 13/76
See application file for complete search history.

(56) References Cited

U.S. PATENT DOCUMENTS

| | | | | |
|---|---|---|---|---|
| 2014/0330449 A1* | 11/2014 | Oman | ..................... | B60R 25/01 701/2 |
| 2015/0296348 A1* | 10/2015 | Ghabra | ............. | H04W 52/0209 455/456.1 |
| 2016/0112954 A1* | 4/2016 | Amizur | ............. | H04W 52/0235 370/311 |

(Continued)

*Primary Examiner* — Thomas M Hammond, III
(74) *Attorney, Agent, or Firm* — Brian D Graham; Charles A. Brill; Frank D. Cimino

(57) ABSTRACT

Techniques related to measuring a time-of-flight (ToF), comprising switching a first measuring station to a main operating mode, transmitting, by the first measuring station, a first ToF packet to a remote device, switching the first measuring station to a receive mode to receive a first ToF response packet from the remote device, receiving, by the first measuring station, the first ToF response packet, determining, a time interval between transmitting of the first ToF packet and receiving the first ToF response packet, receiving a plurality of time intervals from one or more other measuring stations, determining a ToF measurement based on the first time interval and the plurality of time intervals, switching the first measuring station to a secondary operating mode, and transmitting to a second measuring station, an indication to switch to the main operating mode.

20 Claims, 3 Drawing Sheets

(56) References Cited

U.S. PATENT DOCUMENTS

2016/0182548 A1* 6/2016 Ghabra ................. H04L 63/107
                                                                726/23
2017/0273039 A1* 9/2017 Adachi .................. H04L 69/28
2018/0007507 A1* 1/2018 Ghabra ................ H04B 1/3822
2019/0342776 A1* 11/2019 Yong .................... H04W 40/12

* cited by examiner

TIME-OF-FLIGHT MEASUREMENT SYSTEM AND METHOD

RELATED APPLICATIONS

This application claims priority to U.S. Provisional Application No. 62/676,768, filed May 25, 2018, entitled "Low-Power, Multi-Node, Time-of-Flight Measurement System," and U.S. Provisional Application No. 62/786,372, filed Dec. 29, 2018, entitled "Low-Power, Multi-Node, Time-of-Flight Measurement System," which are hereby incorporated herein by reference in their entirety.

BACKGROUND

Low-power wireless devices (LPWD) are often used to unlock or allow access to a secured system. Generally, LPWD systems use very little power, on the order of milliwatts (mW) of power, when transmitting or receiving a radio frequency (RF) signal. As used herein, LPWD generally refers to battery operated devices which are capable of operating for more than a year using an amount of power that could be provided by a coin cell type battery or equivalent. Examples of such a LPWD device may include a Bluetooth® Low Energy (BLE) (Bluetooth is a registered trademark owned by Bluetooth SIG, Inc.) device or keyless entry systems.

As an example of a secured system, a keyless access system on a car may include a battery operated key fob that, when brought within a certain distance of the car, allows the car to be unlocked. While convenient, such systems can be vulnerable to relay attacks such as those illustrated in FIG. 1. A relay attack may be performed where a first attacker 102 receives a signal from a secured system, such as vehicle 104. The signal is relayed, sometimes at another, higher, frequency, to a second attacker 106. The second attacker 106 is proximate to a LPWD 108, such as a key fob. The second attacker receives the signal from the first attacker 102, possibly converts the signal back to the original frequency, and transmits the signal to the LPWD 108. A response signal from the LPWD 108 is relayed through the second attacker 106 and first attacker 102 back to the vehicle 104, allowing the first attacker access to the vehicle 104.

Measuring a time-of-flight (ToF) between the LPWD and the secured system may help address relay attacks. Measuring the ToF would allow presence, spatial position, and relative motion of the LPWD to be determined with reference to the secured system. As relay attacks generally involve distances greater than maximum distance supported by LPWD, ToF can be used to determine whether the LPWD is too far away to be used to access the secured system. However, ToF systems generally require a high level of time resolution, on the order of a few nanoseconds (ns) at the range typically used by LPWD systems. ToF systems may have to deal with multi-path propagation issues where the RF signal reflects off of objects in the environment, which can increase noise in the received signal, making precise measurements difficult. Known ToF systems generally address such issues by using ultrasound, light, or high frequency RF signals, such those used in ultra-wide band (UWB), millimeter wave, or even higher frequencies above 3-80 GHz, as well as time and signal diversity to address these issues. However, multiple transmissions at such high frequencies typically require more power than can be supported in a LPWD system.

SUMMARY

This disclosure relates generally to the field of ToF measurements. More particularly, but not by way of limitation, aspects of the present disclosure relates to a radio frequency device for measuring a ToF. The device includes two or more measuring stations. The two or more measuring stations include a memory, a radio, and one or more processors operatively coupled to the memory. The one or more processors, of a first measuring station, are configured to execute instructions causing the one or more processors to receive an indication that the first measuring station is a main measuring station. The instructions further cause the one or more processors to configure the first measuring station to a transmit mode and transmit a first ToF packet. The instructions further cause the one or more processors to configure the first measuring station to a receive mode and receive, in response to the first ToF packet, a first ToF response packet from a remote device. The instructions further cause the one or more processors to determine a first time interval between the transmitting of the first ToF packet and receiving the first ToF response packet. The instructions further cause the one or more processors transmit the first time interval to a compute node to determine a ToF measurement and transmit an indication that a second measuring station is the main measuring station to the second measuring station.

Another aspect of the present disclosure relates to a system for measuring a ToF. The system includes a plurality of operatively coupled measuring stations where a first measuring station of the plurality of measuring stations is configured in a main operating mode to transmit a first ToF packet to a remote device in a transmit mode and switch to a receive mode to receive a first ToF response packet from the remote device. The first measuring station is further configured to determine a first time interval between the transmitting of the first ToF packet and receiving the first ToF response packet and transmit the first time interval to a compute node to determine a ToF measurement. The first measuring station is further configured to switch to a secondary operating mode. The other measuring stations of the plurality of measuring stations are configured in the secondary operating mode to receive the first ToF packet transmitted from the first measuring station and to receive the first ToF response packet from the remote device to determine a plurality of time intervals between receiving the first ToF packet and receiving the first ToF response packet. The other measuring stations are further configured to transmit the plurality of time intervals to the compute node to determine a ToF measurement. A second measuring station of the plurality of measuring stations is configured to switch from the secondary operating mode to the main operating mode. The system further includes a compute node configured to determine a ToF measurement based on the first and second time intervals.

Another aspect of the present disclosure relates to a method for measuring a ToF. The method includes assigning a first measuring station of a plurality of measuring stations to a main operating mode. The method also includes transmitting, by the first measuring station in a transmit mode, a ToF packet to a remote device and receiving, by each of the other measuring stations, the transmitted ToF packet. The method also includes switching the first measuring station to a receive mode to receive a ToF response packet from the remote device. The method also includes receiving, by each of the measuring stations of the plurality of measuring stations, the ToF response packet from the remote device. The method also includes determining, by the first measuring station, a first time interval between the transmitting of the ToF packet and receiving the ToF response packet, and determining, by each of the other measuring stations, a second time interval between receiving the ToF transmitted by the first measuring station and receiving the ToF response packet from the remote device. The method also includes determining a ToF measurement based on the first and second time intervals, switching the first measuring station to a secondary operating mode, and switching a second measuring station of the plurality of measuring stations to the main operating mode.

BRIEF DESCRIPTION OF THE DRAWINGS

For a detailed description of various examples, reference will now be made to the accompanying drawings in which.

DETAILED DESCRIPTION

Typically, time-of-flight (ToF) systems precisely measure the amount of time between transmission of a signal and receipt of a response. In certain ToF systems, the response may be the transmission signal reflected back to the ToF system. In other ToF systems, the response may be a separate transmission, for example, by a receiver of the transmission signal. Many ToF systems, such as those implemented using RF or light signals, operate based on the speed of light, making relay type attacks beyond a certain maximum distance unlikely. Time-of-flight systems help guarantee a maximum distance between a transmitter and receiver.

The ToF systems described herein use radio frequency (RF) signals, operate at relatively short ranges, and are able to measure time with a high degree of accuracy. For example, as RF signals travel at the speed of light, the disclosed ToF system is able to measure time on the order of a few ns in order to accurately measure a distance where that distance is just a few meters. This level of accuracy can otherwise be difficult to achieve in a low-power system, as such systems may operate with operating clocks of a few MHz. For example, for a low-power system operating at 5 MHz, a single processor cycle takes 200 ns. Additionally, where a low-power wireless device (LPWD) system is used to access a secured system, such as for a keyless entry system for a car or house in a crowded environment, reflected RF signals may present multipath issues where the same signal bounces off of different objects in the environment to the receiver, potentially introducing noise. The disclosed ToF system helps address these issues.

Figure 2:
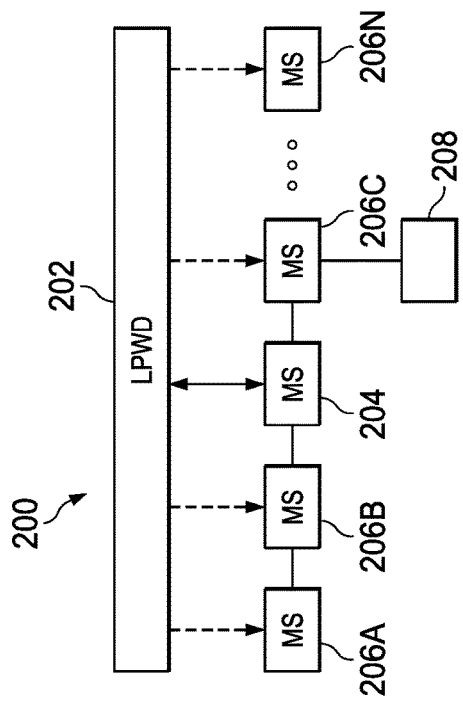
FIG. 2 is an architecture diagram illustrating a system for multi-node low power ToF measurement, in accordance with aspects of the present disclosure.

FIG. 2 is an architecture diagram illustrating a system 200 for multi-node low power ToF measurement, in accordance with aspects of the present disclosure. Generally, a multi-node low power ToF system includes N+1 nodes: one LPWD (e.g., a remote device), one main measuring station (MS), and N−1 secondary MSs, for a total of N MSs. In the example multi-node low-power ToF system 200, a LPWD 202 can communicate, via RF with a main MS 204. The LPWD 202 may include a low-power device operating on relatively low frequencies, such as those in the 2.4 GHz range and below, such as 134 kHz, 315 MHz, and 433 MHz. In certain examples, the LPWD 202 can be based on standard RF devices and protocols, such as a device implementing Bluetooth® Low Energy (BLE), or a remote keyless key fob. The main MS 204 is networked with one or more secondary MS 206A-206N. The MSs, including the main MS 204 and one or more secondary MS 206A-206N can draw more power than LPWD 202, such as from a car battery or local power grid.

Figure 1:
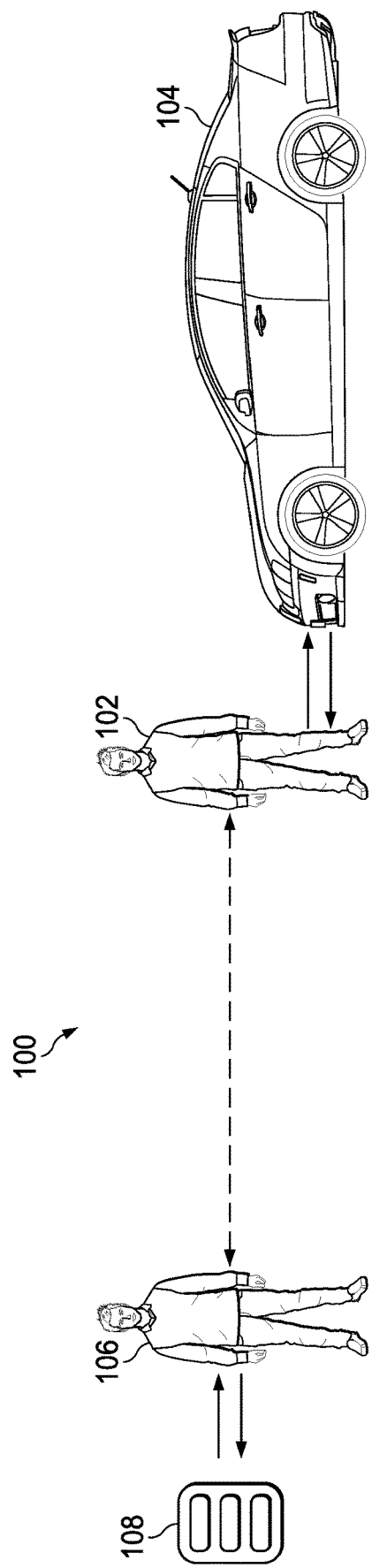
FIG. 1 illustrates a relay attack 100 on prior art systems.

One or more MSs may include sufficient computing resources to function as the compute node 208. In FIG. 1, the compute node 208 is shown coupled to secondary MS 206C, but compute node 208 could be coupled or integrated with any MS, including main MS 204, or all MSs. The computing node may include at least one processor and a memory and operates to collect timing information from the MSs ToF observations and determines the ToF based on the collected timing information. In certain cases, the system 200 may include a single compute node 208. In other cases, the system 200 may include multiple compute nodes. In a system 200 with multiple compute nodes, a first compute node, of the multiple compute nodes, may be designated to collect timing information and determine the ToF, and the compute node designated as the first compute node may be adjusted or passed around, from among the multiple compute nodes.

According to certain aspects, the secondary MSs 206A-206N are capable of the same functionality as the main MS 204. Generally, the MSs, including the main MS 204 and secondary MS 206A-206N can receive ToF packets from the LPWD 202. The main MS 204 differs, in functionality, from the secondary MS 206A-206N in that the main MS 204 operates to transmit ToF packets to the LPWD 202 during a ToF exchange, in addition to receiving ToF response packets from the LPWD. The ToF packets transmitted by the main MS 204 are received by both the LPWD 202 and the secondary MS 206A-206N. Both the main MS 204 and secondary MS 206A-206N receive ToF response packets from the LPWD 202. After a threshold number of ToF packet exchanges are performed the functionality of the main MS 204 is passed to one of secondary MS 206A-206N, such as secondary MS 206C, which then becomes the main MS. Main MS 204 then functions as a secondary MS. In certain cases, the functionality of the main MS 204 is passed to each of the secondary MS 206A-206N during the course of a ToF packet exchange.

The MSs, including main MS 204 and secondary MS 206A-206N, are spatially separated. In certain cases, the MSs, while separated, are located relatively close to each other, such as within about a meter or less. For example, a set of MSs may be lined along a side of a car such that a MS may be located in the each of a front and rear corner, middle of the quarter panel, and in each door. This physical separation allows the ToF response signal from the LPWD 202 to be observed from different spatial points to provide spatial diversity. Additionally, by switching the role of the main MS between the different MSs, additional spatial diversity is achieved, along with time diversity. In certain cases, frequency diversity may also be achieved by repeating the ToF packet exchange on multiple frequencies.

Figure 3:
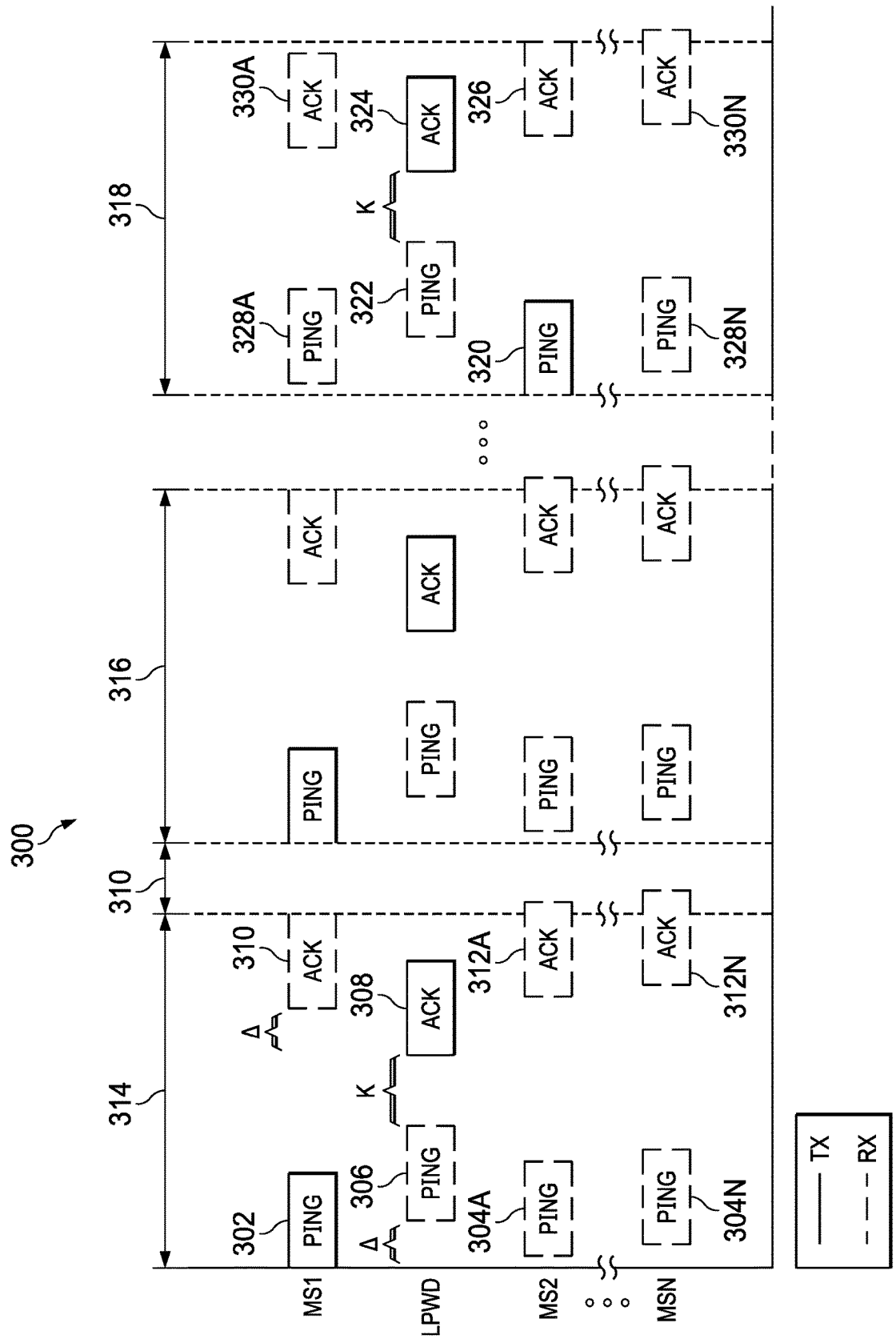
FIG. 3 is a protocol diagram illustrating a packet exchange for a multi-node low power ToF measurement, in accordance with aspects of the present disclosure.

FIG. 3 is a protocol diagram illustrating a packet exchange 300 for a multi-node low power ToF measurement, in accordance with aspects of the present disclosure.

A ToF measurement may start with a first ToF packet exchange 314 where a main MS MS1 transmits a ToF packet, such as ToF ping 302. In one example, the main MS broadcasts the ToF packet. In certain cases, the main MS may periodically send a ToF ping and listen for a response. If no response is detected within a detection window, the main MS continues sending ToF pings until a response is received. In other cases, the main MS MS1 sends a ToF ping 302 in response to receiving a signal from a LPWD, such as one transmitted by the LPWD in response to a pressed button on the LPWD. After the main MS MS1 transmits the ToF ping 302, the main MS MS1 switches to a receive mode.

The LPWD receives the ToF ping at 306 after a propagation delay $\Delta$. Generally, the propagation delay is the amount of time needed for a transmission, such as a packet, to travel from a sender to a receiver. Once the LPWD receives the ToF ping at 306, the LPWD switches to a transmit mode. According to certain aspects, the time K to switch from receive mode to transmit mode is known by the LPWD and MSs and does not change for both the LPWD and MSs (e.g., the time K is fixed). Once the LPWD switches to transmit mode, the LPWD transmits a ToF response, such as ToF ACK 308, in response to the ToF ping 306. The main MS MS1 receives the ToF ACK at 310 after the propagation delay $\Delta$. The total time between the transmission of the ToF ping 302 and reception of the ToF ACK at 310 is K+2 $\Delta$. As the time K needed to switch from receive to transmit and back is known, the ToF in one direction (e.g., $\Delta$) can be calculated by subtracting K from the total time and dividing by 2, that is, $\Delta$=(total time−K)/2. In certain cases, the ToF ping and ToF ACK packets can be simple, header-only packets. In other cases, the ToF packets may include a data payload such as a timestamp.

Generally, a MS may measure a time, such as the total time, by starting a local timer at the precise instant in which the event to be measured starts, such as when the ToF ping 302 is sent. This timer is stopped when the event to be measured stops, such as when the ToF ACK 310 is received. The timer may be measured based on counting a number of clock ticks of a processor between the start of the timer and the stop of the timer. As the processor clock ticks at a known frequency, each tick takes a known amount of time. Each MS generally includes a separate processor with an associated clock. The clocks of each MS, even when operating at the same frequency, do not tick at the same time. Rather, there is a random phase relationship as to when each clock of the MSs ticks. This relationship introduces an amount of uncertainty $\epsilon$ into the measurements as between the clocks. This uncertainty can be accounted for in part by designing a MS timer system such that $\epsilon$ has a uniform distribution with a period of the processor clock with zero mean. For example, the MS timer system may sample multiple time measurements from the MSs and determine a distribution of the phase relationships between the clocks of the multiple MSs. This determined distribution can be used as the uniform distribution of the uncertainty.

The secondary MSs MS2-MSN may be in a receive mode while the main MS MS1 is transmitting. In certain cases, the secondary MSs MS2-MSN only operate in a receive mode with the main MS handling transmitting. The ToF ping may be received (e.g., observed) by the secondary MSs MS2-MSN at 304A-304N after a period of time. As the locations and spacings of the MSs are predetermined, the period of time between the main MS MS1 transmission and the reception by the secondary MSs MS2-MSN may be known. For example, the set of MSs may be configured, such as during design, manufacturing, or a calibration operation, such that the period of time between a transmission by any one MS of the set of MSs and receipt of the transmission by the other MSs of the set is known.

The secondary MSs also receive the ToF ACK 308 at 312A-312N. The secondary MSs can also determine a total time between receiving the ToF ping at 304A-304N and receiving the ToF ACK at 312A-312N to make a ToF observation. As each MS of the set of MSs can make the ToF observation, a single transmission by the LPWD can result in N ToF calculations. The ToF observations from each MS may be transmitted to the compute node to aggregate and the ToF observations used to determine a final ToF for the transaction, for example, by averaging the results, using a pattern-recognition algorithm that looks at a histogram distribution of the transactions times, or any other technique.

As the MSs are spread apart, each ToF exchange is observed from different spatial points, contributing to spatial diversity. While the MSs, both main and secondary, can be located relatively close to each other, such as within about a meter or less, the secondary MSs generally will receive the intended signal (e.g., ToF ACK) very close in time to the main MS due to the small propagation delay, but may receive a significantly different set of reflected RF signals due to the independent probabilities of multipath propagation.

After a first ToF packet exchange 314, a second packet ToF exchange 316 may occur. In certain cases, the second packet ToF exchange 316 may be a repeat (e.g., retransmission) of the first ToF packet exchange 314. In certain cases, the repeat of the first ToF packet exchange 314 may utilize a different packet, for example with a modified time stamp, synchronization indicator, encryption code, etc. Repeating the ToF packet exchange provides increased time diversity by performing multiple transmissions over a period of time, which helps mitigate short term disturbances, such as transient interferences or temporary multipath conditions. Repetition further helps increase clock sampling accuracy between the MSs, effectively providing a faster virtual clock as compared to the clocks of the MSs by aggregating multiple clock samplings together and taking into account the distribution of the phase relationships between the clocks of the MSs. This repetition of the first ToF packet exchange 314 may occur a number, M, of times. Where repetition is used, the number of ToF observations per M ToF packet sent by the LPWD is a function of N*M.

In some cases, the second packet ToF exchange 316 is similar to the first ToF packet exchange 314, but occurs in a different frequency from the frequency used for the first ToF packet exchange 314, in order to provide frequency diversity by performing multiple transmissions over multiple frequencies. Measurements taken at different frequencies alter the propagation environment for the RF signals, helping to increase accuracy as a result of increased frequency diversity. The number of different frequencies may be expressed as P. Where multiple frequencies are used, the number of ToF observations per M ToF packet sent by the LPWD is a function of N*P. Where repetition and multiple frequencies are used, the number of ToF observations per M*P ToF packet sent by the LPWD is a function of N*M*P.

For certain packet exchanges, the role of the main MS may be reassigned from previous main MS to a new main MS. For examples, the third ToF packet exchange 318 illustrates that the main MS has been reassigned from MS1 to MS2. The previous main MS MS1 then takes on the role of a secondary MS. The new main MS MS2 then starts the third ToF packet exchange 318 by transmitting a ToF ping at 320. The LPWD receives the ToF ping at 322 and after the time K needed to switch from receive mode to transmit mode, the LPWD transmits a ToF ACK in response at 324, similar to the first ToF packet exchange 314. The new main MS MS2 receives the ToF ACK at 326. The secondary MSs, including MS1, again observe the ToF ping from the new main MS MS2 at 328A-328N and the ACK ToF ACK from the LPWD at 330A-330N. Reassigning the role of the main MS may be performed in a known sequence, such as a pre-defined round robin sequence. In certain cases, a reassignment indication may be passed among the MSs based on the known sequence. In other cases, reassignment may be based, for example, on a passed token or signal from another MS or the compute node.

Switching the functionality of the main MS to one of the secondary MSs may be performed one or more times. This switching may be based on a switch pattern where the MS designated as the main MS hands off the main MS functionality to a specific other MS of the set of MSs. This switch pattern may loop through each MS in the set of MSs and then repeat the switch pattern again. The switching may be directed, for example, by a signal from the compute node. In other cases, each MS may be configured to pass a token or other indication to a specific other MS after a set of ToF transmit/receive cycles is performed. As an example, MS 206A may be configured to always hand off main MS functionality to MS 206B, MS 206B always hands off main MS functionality to MS 204, and so forth until MS 206N hands off main MS functionality back to MS 204A. Where switching is performed for each of the secondary MSs such that each MS of the set of MSs take a turn as the main MS, the number of ToF calculations would be N*N, for N ToF packets sent by the LPWD. Thus the number of ToF observations possible per LPWD ToF packet increases exponentially with the number of MSs.

In implementations utilizing each diversity source including switching main MS functionality to each secondary MS, repetition, and multiple frequencies, the total number of ToF observations is $N^2*M*P$ for N*M*P ToF packets sent by the LPWD. For example, for a system with seven MSs (N=7) and one LPWD with 16 packets (M=16) transmitted by each MS each for four channels (P=4) with a transaction time per packet of 200 μs, the LPWD performs a total of 448 transactions with the MSs over the course of 90 milliseconds. However, the MSs perform a total of 3136 ToF observations of the transactions, greatly increasing the number of observations as compared to the number of transactions. This allows the LPWD to conserve power by increasing the number of ToF observations for each transaction with the LPWD.

Generally, the LPWD and MSs operate with relatively low clock rates, for example under a hundred MHz. At these low clock rates, precisely timing the ToF transaction can help boost accuracy. For example, digital timing may be based on counting a number of clock cycles between events and taking into consideration the amount of time required for each clock cycle. At 40 MHz, each clock cycle takes 25 ns. When attempting to measure a distance of three meters, for a round-trip distance of six meters, the propagation time of an RF signal is approximately 3.3 ns per meter, so the round-trip propagation time of the RF signal is approximately 20 ns. As the propagation time is effectively less than a single clock cycle, a single clock cycle margin of error would impact the precision of the measurements. To help boost this precision, the disclosed system is able to consistently switch between receiving and transmitting modes, for example for the LPWD and main MS, in a known and fixed amount of time.

Figure 4:
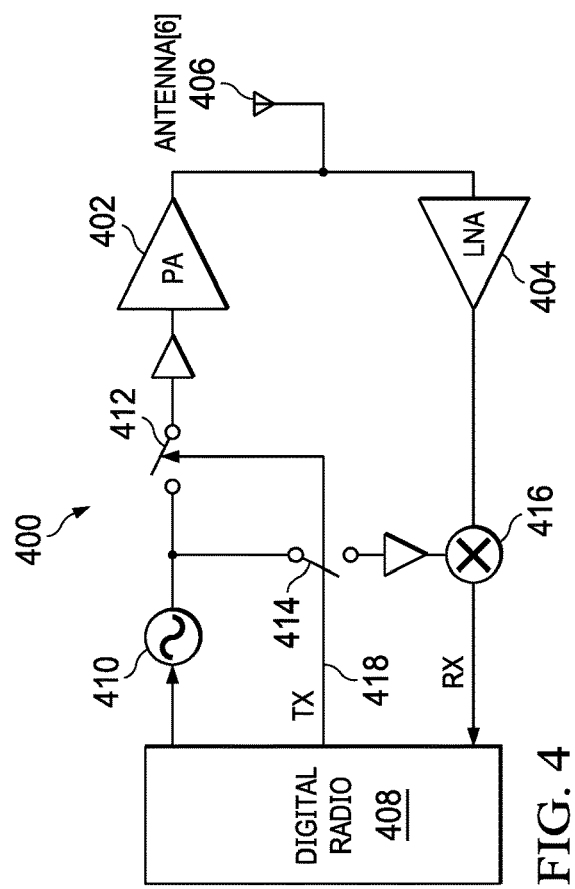
FIG. 4 is a circuit diagram illustrating a radio transceiver circuit for multi-node low power ToF measurement, in accordance with aspects of the present disclosure.

FIG. 4 is a circuit diagram illustrating a radio transceiver circuit 400 for multi-node low power ToF measurement, in accordance with aspects of the present disclosure. Radio transceiver circuit 400 may be implemented in each MS and may be integrated with hardware that otherwise is capable of complying with existing standards, such as BLE. In this example the transceiver circuit 400 includes a power amplifier (PA) 402 for amplifying a signal for transmission and a low-noise amplifier (LNA) 404 to amplify a received signal via antenna 406 and sent to a digital radio 408. According to certain aspects, the PA 402 and LNA 404 can be simultaneously powered such that the PA 402 and LNA 404 are powered and the power, such as from a voltage stabilizer, is stabilized simultaneously for both the PA 401 and the LNA 404. In certain cases, powering and stabilizing the power may be performed prior to starting the transmission/receiving sequence. Generally, where RF transceiver devices (e.g., devices capable of transmitting and receiving RF signals) include a PA and LNA, the PA and the LNA are separately powered up by charging low drop-out (LDO) linear regulators to an appropriate VDD level. However, this charging can introduce several μs of uncertainty, potentially resulting inconsistencies that can affect the time K needed to switch from receive mode to transmit mode and throwing off time measurements.

Transceiver circuit 400 further includes a single RF phase lock loop (PLL) 410 that can be used for both transmitting and receiving signals, in accordance with aspects of the present disclosure. When transmitting, the RF PLL 410 is connected to the PA via switch 412 and switch 414 is open. When in a receive mode, switch 412 is open and switch 414 is closed, connecting the RF PLL 410 to the receiver mixer 416. Having a single RF PLL 410 helps allow the RF PLL 410 to get in lock once and stay in lock, without having to regain a lock while transitioning between the transmitting mode and receiving mode and the receiving mode and the transmitting mode.

In certain examples, transceiver circuit 400 utilizes a single control line 418, generated by digital radio 408, to control switch 412 and switch 414. Using a single control line to drive the switches of the local oscillator (e.g., PLL) signal helps provide certainty that the circuit has switched between receiving and transmitting. While multiple control lines can be used, using a single control helps avoid the situation where both the PA 402 and LNA 404 receive a signal at the same time and load the oscillator at the same time, which may have unexpected consequences for the circuitry.

Figure 5:
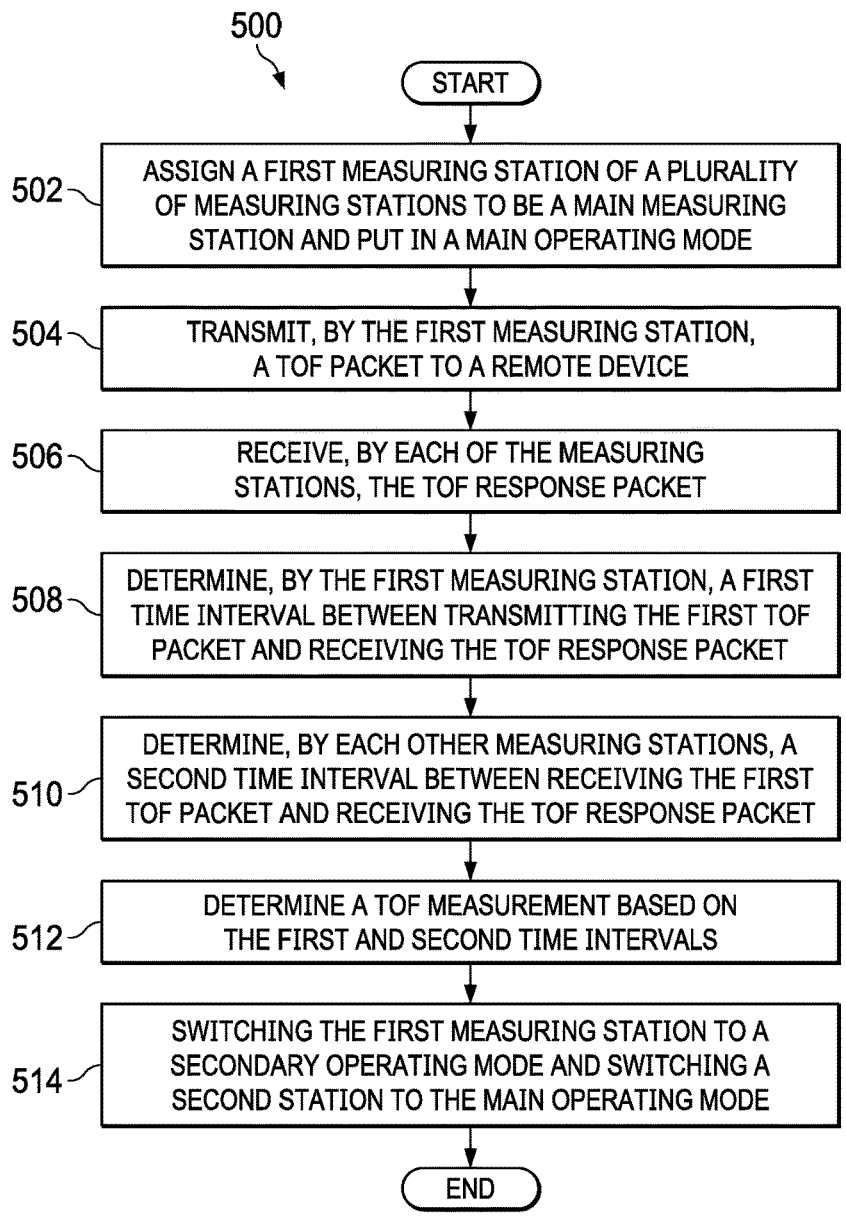
FIG. 5 is a flow diagram illustrating a technique for time of flight measurements, in accordance with aspects of the present disclosure.

FIG. 5 is a flow diagram illustrating a technique 500 for time of flight measurements, in accordance with aspects of the present disclosure. At block 502, the first measuring station, of a plurality of measuring stations, is assigned to be the main measuring station, and put in a main operating mode. This assignment may be based, for example, on a received indication that the first measuring station is assigned as the main measuring station. At block 504, the first measuring station is switched to a transmit mode and transmits a ToF packet to a remote device. According to certain aspects, amount of time taken to switch from transmit mode to receive mode and from receive mode to transmit mode is known and constant. In certain cases, the remote device includes a LPWD. The LPWD receives the ToF packet, switches to a transmit mode in a known amount of time, and transmits a ToF response packet.

Each measuring station of the plurality of measuring stations receives the ToF response packet at block 506. The first measuring station, prior to receiving the ToF response packet, is switched to a receiving mode. In certain cases, the other measuring stations are in a secondary operating mode and already in the receiving mode. At block 508, the first measuring station determines a first time interval between transmitting the first ToF packet and receiving the ToF response packet. At block 510, each of the other measuring stations determine a second time interval between receiving the ToF transmitted by the first measuring station and receiving the ToF response packet from the LPWD. At block 512, a ToF measurement is determined based on the first and second time intervals. According to certain aspects, this determination may be based on any known calculation or algorithm for determining a ToF and may be performed by the main measuring station, another measuring station of the plurality of measuring stations, or by a compute node. At block 514, the first measuring station is switched to the secondary operating mode and a second measuring station is switched to the main operating mode. According to certain aspects of the present disclosure, blocks 504-514 may be repeated until each measuring station of the plurality of measuring stations has been switched to the main operating mode, transmitted the ToF packet to the remote device and measured the first time interval based on the ToF response packet.

Figure 6:
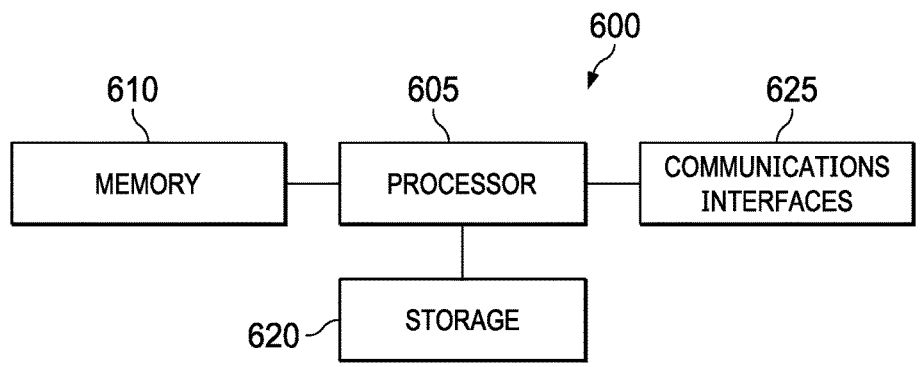
FIG. 6 is an architecture diagram illustrating a processing system, in accordance with aspects of the present disclosure.

As illustrated in FIG. 6, processing device 600 includes a processing element such as processor 605 that contains one or more hardware processors, where each hardware processor may have a single or multiple processor cores. In one embodiment, the processor 605 may include at least one shared cache that stores data (e.g., computing instructions) that are utilized by one or more other components of processor 605. For example, the shared cache may be a locally cached data stored in a memory for faster access by components of the processing elements that make up processor 605. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 6, the processing elements that make up processor 605 may also include one or more other types of hardware processing components, such as graphics processing units (GPUs), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory computer readable storage medium configured to store various types of data. For example, memory 610 may include one or more volatile devices such as random access memory (RAM). Non-volatile storage devices 620 can include one or more disk drives, optical drives, solid-state drives (SSDs), tap drives, flash memory, read only memory (ROM), and/or any other type memory designed to maintain data for a duration time after a power loss or shut down operation. The non-volatile storage devices 620 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600.

Computing device 600 may also include one or more communications interfaces 625 which may be communicatively coupled to processor 605. The one or more communications interfaces may include a radio communications interface for interfacing with one or more radio communications devices, such as digital radio 408 in FIG. 4. In certain cases, elements coupled to the processor may be included on hardware shared with the processor. For example, the communications interfaces 625, storage, 620, and memory 610 may be included, along with other elements such as the digital radio, in a single chip or package, such as in a system on a chip (SOC).

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

The invention claimed is:

1. A device for measuring a time-of-flight (ToF), the device comprising:
   a first measuring station, the first measuring station comprising:
      a radio transceiver;
      one or more processors coupled to the radio transceiver; and
      a non-transitory computer readable storage medium storing a program for execution by the one or more processors, the program including instructions to:
         switch to a main operating mode based on a received indication to switch to a main operating mode;
         operate in the main operating mode to:
            transmit a first ToF packet;
            switch, after transmitting the first ToF packet, the first measuring station to a receive mode;
            receive, after transmitting the first ToF packet, a first ToF response packet from a remote device;
            determine a first time interval between transmitting the first ToF packet and receiving the first ToF response packet;
            transmit the first time interval to a compute node to determine a first ToF measurement; and
            transmit, to a second measuring station, after determining the first time interval, an indication to switch to the main operating mode to the second measuring station; and operate in a secondary operating mode to:
receive, from the second measuring station, a second ToF packet;
receive, from the remote device, a second ToF response packet associated with the second ToF packet;
determine a second time interval between the receiving of the second ToF packet and the receiving of the second ToF response packet; and
transmit the second time interval to the compute node to determine a second ToF measurement.

2. The device of claim 1, wherein the program further includes instructions to operate in the main operating mode to:
configure the first measuring station to a transmit mode;
transmit a third ToF packet;
configure the first measuring station to the receive mode;
receive, in response to the third ToF packet, a third ToF response packet from the remote device;
determine a third time interval between transmitting the third ToF packet and receiving the third ToF response packet; and
transmit the third time interval to the compute node.

3. The device of claim 2, wherein the third ToF packet is a retransmission of the first ToF packet.

4. The device of claim 1, program further includes instructions to operate in the main operating mode to:
configure the first measuring station to a transmit mode;
transmit a fourth ToF packet, the fourth ToF packet transmitting on a different frequency than a frequency used for transmitting the first ToF packet;
configure the first measuring station to the receive mode;
receive, after transmitting the fourth ToF packet, a fourth ToF response packet from the remote device;
determine a fourth time interval between transmitting the fourth ToF packet and receiving the fourth ToF response packet; and
transmit the fourth time interval to the compute node.

5. The device of claim 1, wherein the radio transceiver comprises a phase lock loop (PLL), the PLL selectively coupled to a power amplifier for amplifying a signal and a receiver mixer for receiving the signal.

6. The device of claim 1, wherein the first measuring station is configured to switch from a transmit mode to the receive mode in a fixed period of time.

7. The device of claim 1, wherein the first measuring station further comprises the compute node.

8. The device of claim 1, wherein:
the first ToF packet is a ping packet; and
the first ToF response packet is an acknowledge packet.

9. A system for measuring a time-of-flight (ToF), the system comprising a first measuring station, the first measuring station comprising:
a radio transceiver; and
one or more processors coupled to the radio transceiver, the one or more processors configured to cause the first measuring system to:
switch a first measuring station to a main operating mode;
transmit, by the first measuring station in a transmit mode, a first ToF packet to a remote device;
switch the first measuring station to a receive mode to receive a first ToF response packet associated with the first ToF packet from the remote device;
receive, by the first measuring station, the first ToF response packet from the remote device;
determine, by the first measuring station, a first time interval between transmitting of the first ToF packet and receiving the first ToF response packet;
receive, by the first measuring station, a plurality of time intervals from one or more other measuring stations, wherein the plurality of time intervals are based on the first ToF response packet;
determine, by the first measuring station, a ToF measurement based on the first time interval and the plurality of time intervals;
switch the first measuring station to a secondary operating mode; and
transmit, from the first measuring station to a second measuring station, an indication to switch to the main operating mode.

10. The system of claim 9, wherein the system is further configured to:
repeat the steps of transmitting the first ToF packet to the remote device, switching the first measuring station to the receive mode, receiving the first ToF response packet, determining the first time interval, receiving the plurality of time intervals, determining the ToF measurement, switching the first measuring station to the secondary operating mode and transmitting the indication to switch to the main operating mode for each of the one or more other measuring stations.

11. The system of claim 9, wherein the system is further configured to:
transmit a second ToF packet;
configure the first measuring station to the receive mode;
receive, after transmitting the second ToF packet, a second ToF response packet from the remote device;
determine a second time interval between transmitting the second ToF packet and receiving the second ToF response packet; and
determine, by the first measuring station, a ToF measurement based on the second time interval.

12. The system of claim 11, wherein the second ToF packet is a retransmission of the first ToF packet.

13. The system of claim 9, wherein the system is further configured to:
transmit a third ToF packet, the third ToF packet transmitted on a different frequency than a frequency used for transmitting the first ToF packet;
configure the first measuring station to the receive mode;
receive, in response to the third ToF packet, a third ToF response packet from the remote device;
determine a third time interval between transmitting the third ToF packet and receiving the third ToF response packet; and
determine, by the first measuring station, a ToF measurement based on the third time interval.

14. The system of claim 9, wherein the first measuring station is configured with a radio, the radio coupled to a phase lock loop (PLL), the PLL selectively coupled to a power amplifier and a receiver mixer for transmitting and receiving a signal, respectively.

15. A method for measuring a time-of-flight (ToF), the method comprising:
switching a first measuring station to a main operating mode;
transmitting, by the first measuring station in a transmit mode, a first ToF packet to a remote device;

switching the first measuring station to a receive mode to receive a first ToF response packet associated with the first ToF packet from the remote device;

receiving, by the first measuring station, the first ToF response packet from the remote device;

determining, by the first measuring station, a first time interval between transmitting the first ToF packet and receiving the first ToF response packet;

receiving, by the first measuring station, a plurality of time intervals from one or more other measuring stations, wherein the plurality of time intervals are based on the first ToF response packet;

determining, by the first measuring station, a ToF measurement based on the first time interval and the plurality of time intervals;

switching the first measuring station to a secondary operating mode; and transmitting, from the first measuring station to a second measuring station, an indication to switch to the main operating mode.

16. The method of claim 15, further comprising:

repeating the steps of transmitting the first ToF packet to the remote device, switching the first measuring station to the receive mode, receiving the first ToF response packet, determining the first time interval, receiving the plurality of time intervals, determining the ToF measurement, switching the first measuring station to the secondary operating mode and transmitting the indication to switch to the main operating mode for each of the one or more other measuring stations.

17. The method of claim 15, further comprising:
transmitting a second ToF packet;
configuring the first measuring station to the receive mode;
receiving, after transmitting the second ToF packet, a second ToF response packet from the remote device;
determining a second time interval between transmitting the repeated second ToF packet and receiving the second ToF response packet; and
transmitting the second time interval to a compute node to determine a ToF measurement.

18. The method of claim 17, wherein the second ToF packet is a retransmission of the first ToF packet.

19. The method of claim 15, further comprising:
transmitting a third ToF packet, the third ToF packet transmitted on a different frequency than a frequency used for transmitting the first ToF packet;
configuring the first measuring station to the receive mode;
receiving, in response to the third ToF packet, a third ToF response packet from the remote device;
determining a third time interval between transmitting the third ToF packet and receiving the third ToF response packet; and
transmitting the third time interval to a compute node to determine a second ToF measurement.

20. The method of claim 15, wherein the first measuring station is configured with a radio, the radio coupled to a phase lock loop (PLL), the PLL selectively coupled to a power amplifier and a receiver mixer for transmitting and receiving a signal, respectively.

* * * * *